United States Patent
Mori et al.

(10) Patent No.: US 11,101,717 B2
(45) Date of Patent: Aug. 24, 2021

(54) MAGNET STRUCTURE, ROTATIONAL ANGLE DETECTOR, AND ELECTRIC POWER STEERING DEVICE

(71) Applicant: TDK Corporation, Tokyo (JP)

(72) Inventors: Naoki Mori, Tokyo (JP); Yoshiaki Okada, Tokyo (JP)

(73) Assignee: TDK Corporation, Tokyo (JP)

(*) Notice: Subject to any disclaimer, the term of this patent is extended or adjusted under 35 U.S.C. 154(b) by 229 days.

(21) Appl. No.: 16/185,263

(22) Filed: Nov. 9, 2018

(65) Prior Publication Data

US 2019/0280568 A1  Sep. 12, 2019

(30) Foreign Application Priority Data

Mar. 8, 2018 (JP) .............. JP2018-042168

(51) Int. Cl.
| | |
|---|---|
| *H02K 11/00* | (2016.01) |
| *H02K 11/215* | (2016.01) |
| *G01D 5/16* | (2006.01) |
| *B62D 5/04* | (2006.01) |
| *H01F 7/02* | (2006.01) |
| *H01F 10/32* | (2006.01) |
| *H01F 1/08* | (2006.01) |
| *H01F 1/113* | (2006.01) |

(52) U.S. Cl.
CPC ......... *H02K 11/215* (2016.01); *B62D 5/0481* (2013.01); *G01D 5/16* (2013.01); *H01F 7/0221* (2013.01); *H01F 7/0294* (2013.01); *H01F 1/083* (2013.01); *H01F 1/113* (2013.01); *H01F 10/3254* (2013.01); *H01F 10/3286* (2013.01)

(58) Field of Classification Search
CPC .................................................. H02K 11/215
See application file for complete search history.

(56) References Cited

U.S. PATENT DOCUMENTS

| | | | | |
|---|---|---|---|---|
| 7,847,446 B2* | 12/2010 | Becker | ...... | G01P 1/04 |
| | | | | 310/68 B |
| 9,929,629 B2* | 3/2018 | Taniguchi | .......... | H02K 15/0435 |
| 10,256,702 B2* | 4/2019 | Hager | .................. | H02K 11/215 |
| 10,605,624 B2* | 3/2020 | Forthaus | .............. | G01R 33/038 |
| 2013/0241538 A1* | 9/2013 | Akabane | ................ | G01D 5/145 |
| | | | | 324/207.25 |
| 2016/0265940 A1* | 9/2016 | Burgdorf | ............. | H02K 11/215 |
| 2016/0285331 A1 | 9/2016 | Ichikawa et al. | | |

(Continued)

FOREIGN PATENT DOCUMENTS

| | | |
|---|---|---|
| JP | 2013-148457 A | 8/2013 |
| WO | WO-2015/140961 A1 | 9/2015 |

*Primary Examiner* — Alexander Talpalatski
(74) *Attorney, Agent, or Firm* — Faegre Drinker Biddle & Reath LLP

(57) ABSTRACT

A magnet structure is a magnet structure for a TMR element which is an MR element. The magnet structure includes a bonded magnet compact that has a first main surface facing the TMR element, and a second main surface on a side opposite to the first main surface; and a tubular member that supports the bonded magnet compact. The bonded magnet compact has a gate portion which is provided on the second main surface and includes a gate mark formed by performing injection molding. The gate portion is provided at a position overlapping a center on the second main surface when seen from the second main surface side.

7 Claims, 7 Drawing Sheets

(56) References Cited

U.S. PATENT DOCUMENTS

2016/0352190 A1* 12/2016 Hieda ................... H02K 11/215
2018/0010927 A1*  1/2018 Forthaus ............ G01R 33/0017
2018/0052009 A1*  2/2018 Kim ........................ G01D 5/16
2018/0091008 A1*  3/2018 Oikawa .................. H02K 1/276

* cited by examiner

MAGNET STRUCTURE, ROTATIONAL ANGLE DETECTOR, AND ELECTRIC POWER STEERING DEVICE

TECHNICAL FIELD

The present invention relates to a magnet structure, a rotational angle detector, and an electric power steering device.

BACKGROUND

In the related art, in electric power steering devices or the like for an automobile, a magnetic rotational angle detector has been used for the purpose of detecting a rotation position of an electric motor. For example, PCT International Publication No. WO 2015/140961 discloses an electric power steering device including an electric motor, a sensor magnet that is assembled at one end of the electric motor, and a rotation sensor that detects a magnetic field generated by the sensor magnet.

The inventors have examined using a magnetoresistance effect element as a rotation sensor in an electric power steering device as described above. In the case of using a magnetoresistance effect element, a rotation position is detected by utilizing the fact that a resistance value of the magnetoresistance effect element continuously changes in accordance with the direction of a magnetic field generated by a magnet structure (sensor magnet). As a result of intense investigation performed based on such a principle, the inventors have ascertained that in order to realize highly accurate detection by using a magnetoresistance effect element, there is a need to enhance the symmetrical properties of the magnetic field formed by a magnet structure.

The present invention has been made in consideration of the foregoing circumstances, and an object thereof is to provide a magnet structure which can generate a magnetic field having highly symmetrical properties, a rotational angle detector which can be obtained by using this magnet structure, and an electric power steering device which can be obtained by using this rotational angle detector.

SUMMARY

According to an aspect of the present invention, there is provided a magnet structure for a magnetoresistance effect element. The magnet structure includes a magnet compact that has a first main surface facing the magnetoresistance effect element, and a second main surface on a side opposite to the first main surface; and a support portion that supports the magnet compact. The magnet compact has a gate portion which is provided on the second main surface and includes a gate mark formed by performing injection molding. The gate portion is provided at a position overlapping a center on the second main surface when seen from the second main surface side.

The magnet compact of this magnet structure has the gate portion which is provided on the second main surface and includes a gate mark formed by performing injection molding. The gate portion is provided at a position overlapping the center on the second main surface when seen from the second main surface side. In this manner, if a gate portion is provided on the second main surface, the first main surface facing a tunnel magnetoresistance effect element can be formed to be flat. Therefore, a magnetic field having highly symmetrical properties can be generated on the first main surface side. In addition, if a gate portion which may affect a magnetic field generated by the magnet compact is provided at a position overlapping the center on the second main surface, the influence of the gate portion on the symmetrical properties of a magnetic field on the first main surface side can be reduced. Therefore, a magnetic field having highly symmetrical properties can be generated by the magnet structure.

According to the aspect, the support portion may be a tubular member which supports a side surface of the magnet compact on one end side. The first main surface of the magnet compact may be disposed on the one end side of the support portion. The second main surface may be disposed to be closer to the one end side than the other end on the other end side opposite to the one end side of the support portion. According to this configuration, the magnet structure can be attached to a rotary portion (rotary shaft or the like) of an external component (electric motor or the like) via the other end of the tubular member. In this case, the second main surface is disposed to be closer to the one end side than the other end of the support portion. Therefore, in a state in which the magnet structure is attached to the rotary portion, a closed space is formed by the second main surface, the support portion, and the rotary portion. Accordingly, the gate portion is positioned inside the closed space. Therefore, contamination can be prevented from being generated due to a gate mark.

According to the aspect, the support portion may be a tubular shaft which has a smaller outer diameter than the magnet compact, is attached to the second main surface side, and extends in a direction intersecting the second main surface. The gate portion may be positioned on an inner side of the shaft when seen from the second main surface side. According to this configuration, the magnet structure can be attached to a rotary portion (rotary shaft or the like) of an external component (electric motor or the like) via the shaft. In this case, in a state in which the magnet structure is attached to the rotary portion, a closed space is formed by the second main surface, the shaft, and the rotary portion. The gate portion is positioned on the inner side of the shaft. Accordingly, the gate portion is positioned inside the closed space. Therefore, contamination can be prevented from being generated due to a gate mark.

According to another aspect of the present invention, there is provided a rotational angle detector including the magnet structure, and a magnetoresistance effect element that is disposed to face the first main surface of the magnet structure. This rotational angle detector includes the above-described magnet structure which can generate a magnetic field having highly symmetrical properties. Therefore, the accuracy of detecting a rotational angle can be enhanced.

According to the aspect, a magnetoresistance ratio of the magnetoresistance effect element may be 90% or higher. In this manner, when the magnetoresistance ratio is 90% or higher, a large output can be obtained from the magnetoresistance effect element. Therefore, the accuracy of detecting a rotational angle can be further enhanced.

According to the aspect, the magnetoresistance effect element may be a tunnel magnetoresistance effect element. The magnetoresistance ratio of the tunnel magnetoresistance effect element is 90% or higher. Therefore, the accuracy of detecting a rotational angle can be enhanced by using the tunnel magnetoresistance effect element.

According to another aspect of the present invention, there is provided an electric power steering device including the rotational angle detector. This electric power steering device includes the above-described rotational angle detector which can enhance the accuracy of detecting a rotational angle. Therefore, highly accurate torque assistance can be performed.

According to the present invention, the magnet structure which can generate a magnetic field having highly symmetrical properties, the rotational angle detector which can be obtained by using this magnet structure, and the electric power steering device which can be obtained by using this rotational angle detector are provided.

DETAILED DESCRIPTION

Hereinafter, with reference to the drawings, various embodiments will be described in detail. In each of the drawings, the same reference signs are applied to the same or corresponding parts, and duplicate description will be omitted.

Figure 1:
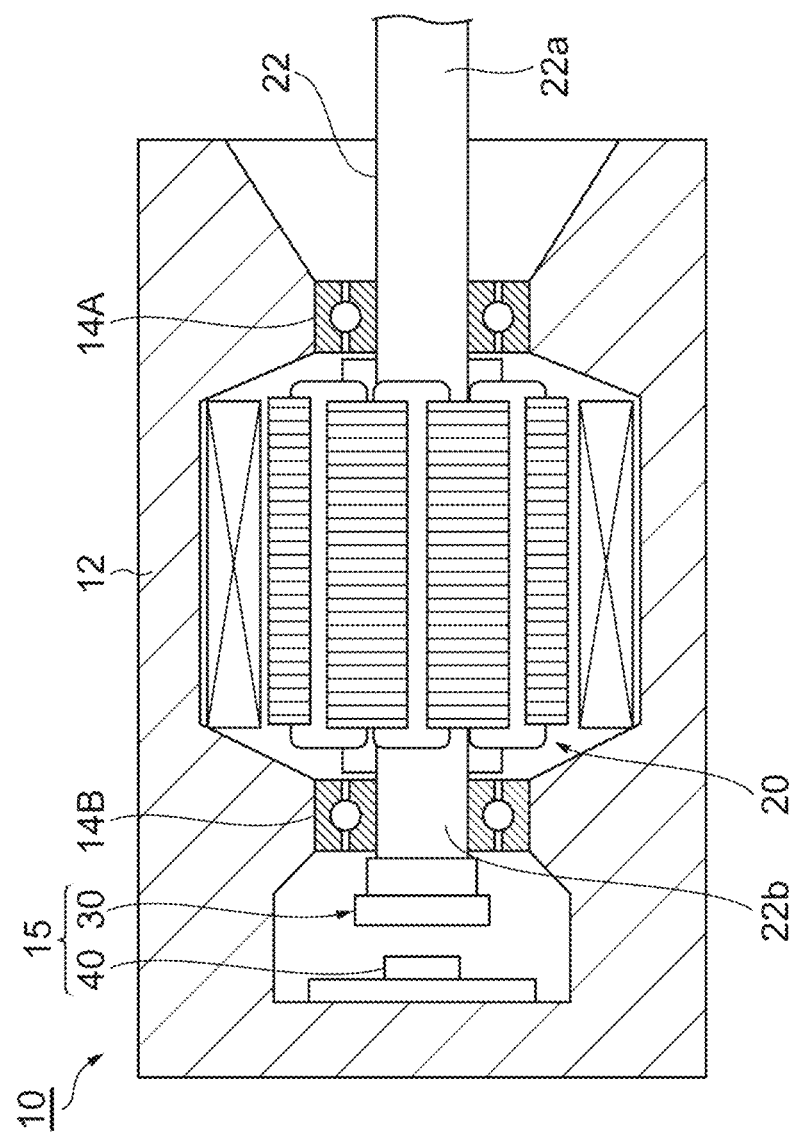
FIG. 1 is a schematic cross-sectional view illustrating a motor assembly including a rotational angle detector according to an embodiment.

With reference to FIG. 1, a motor assembly 10 including a rotational angle detector according to the present embodiment will be described. As illustrated in FIG. 1, the motor assembly 10 has a configuration in which a rotational angle detector 15 and an electric motor 20 are accommodated inside a casing 12.

The electric motor 20 includes a rotary shaft 22 having a torque-side end portion 22a and a sensor-side end portion 22b. The torque-side end portion 22a of the rotary shaft 22 is rotatably held by ball bearings 14A provided in the casing 12. The sensor-side end portion 22b is rotatably held by ball bearings 14B provided in the casing 12.

The rotational angle detector 15 is disposed in the sensor-side end portion 22b. The rotational angle detector 15 includes a magnet structure 30 and a magnetoresistance effect element (MR element). As an MR element, an anisotropic magnetoresistance effect element (AMR element), a giant magnetoresistance effect element (GMR element), a tunnel magnetoresistance effect element (TMR element), and the like can be used. The fraction of a change in resistance of an MR element is expressed by a magnetoresistance ratio (MR ratio). An MR ratio is obtained by dividing the difference between two resistance values in a magnetized state by a resistance value in a balanced state. That is, the MR ratio indicates the magnitude of a resistance value when the magnetization direction of an MR element is in the opposite direction, with respect to a resistance value when the magnetization direction is in the same direction. An MR element having a high MR ratio is regarded as a highly sensitive MR element. The MR ratios of an AMR element and a GMR element are approximately 3% and 12%. In contrast, the MR ratio of a TMR element is 90% or higher. If a highly sensitive MR element is used as a rotation sensor of the rotational angle detector 15, a large output can be obtained from the rotational angle detector 15. An output in the case of using a TMR element as a rotation sensor is approximately 20 times an output in the case of using an AMR element and is approximately six times an output in the case of using a GMR element. Therefore, it is preferable to use a TMR element in order to obtain an output of the rotational angle detector 15. Accordingly, the accuracy of detecting a rotational angle can be enhanced. Hereinafter, a case in which a TMR element 40 is used as a rotation sensor of the rotational angle detector 15 will be described. In addition, the rotational angle detector 15 can be reduced in size by using the TMR element 40 as a rotation sensor. The rotation sensor can be a two-shaft sensor having two MR elements and detects the direction of a magnetic field within a surface orthogonal to a central axis of the magnet structure 30.

The magnet structure 30 is attached to the sensor-side end portion 22b of the rotary shaft 22 of the electric motor 20. Accordingly, the magnet structure 30 rotates together with the rotary shaft 22. Therefore, the direction of a magnetic field generated by the magnet structure 30 changes in accordance with rotation of the electric motor 20. In addition, the TMR element (MR element) 40 is disposed inside the casing 12 at a position facing the magnet structure 30. The rotational angle detector 15 detects the rotational angle of the electric motor 20 utilizing the fact that the resistance value of the TMR element 40 continuously changes in accordance with the direction of a magnetic field generated by the magnet structure 30. For example, a change in the resistance value of the TMR element 40 is measured by a detection circuit constituted of a Wheatstone bridge circuit or the like.

Figure 2:
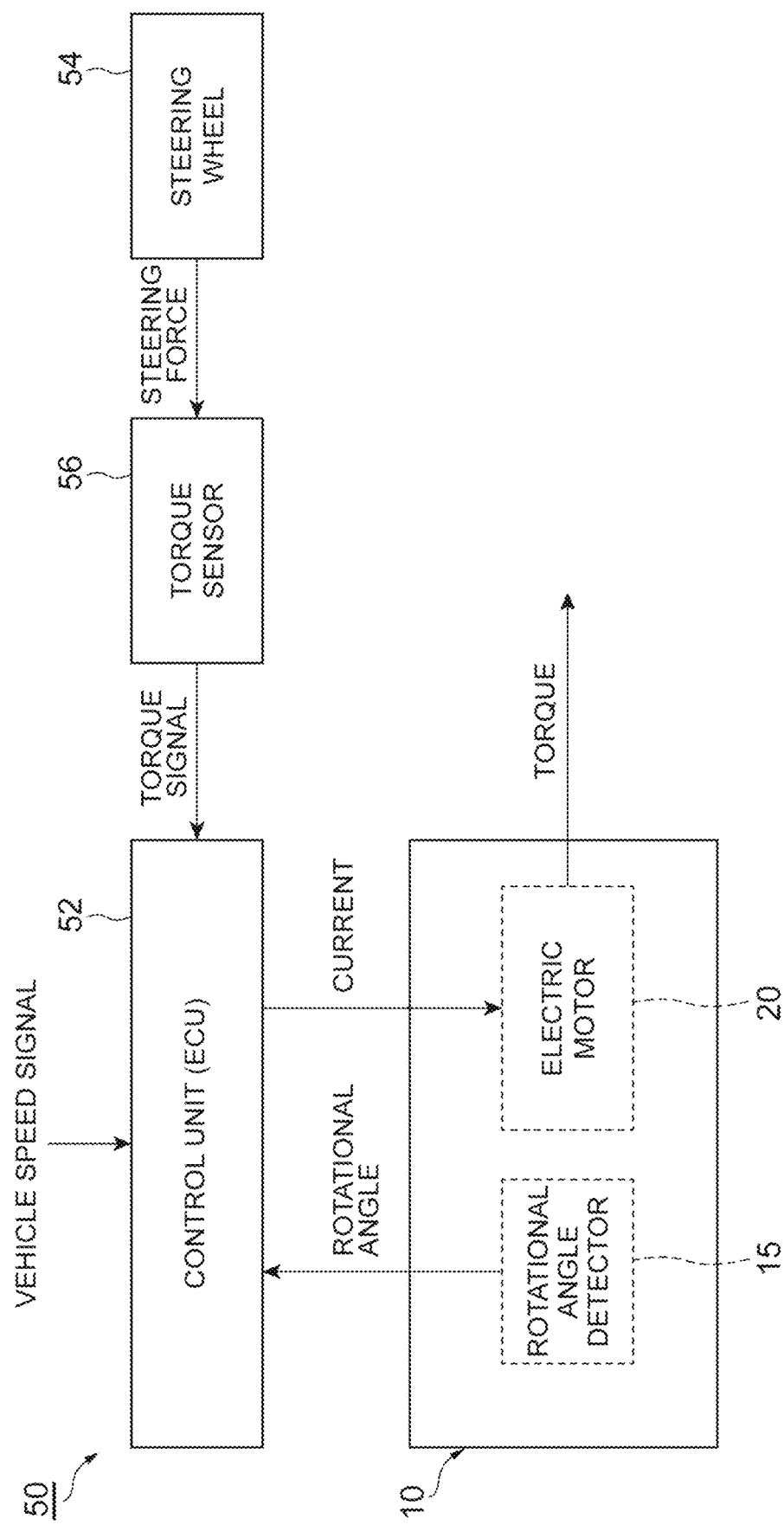
FIG. 2 is a block configuration diagram illustrating an electric power steering device in which the motor assembly in FIG. 1 is used.

Here, with reference to FIG. 2, an electric power steering device 50 in which the motor assembly 10 is used will be described.

In addition to the motor assembly 10 described above, the electric power steering device 50 includes a control unit 52 which is generally called an electronic control unit (ECU), and a steering wheel 54. The control unit 52 is configured to be able to receive a vehicle speed signal from a vehicle, information related to the rotational angle of the rotary shaft 22 detected by the rotational angle detector 15 of the motor assembly 10, and a torque signal of a torque sensor 56 related to a steering force of the steering wheel 54. In addition, the control unit 52 is configured to be able to adjust a current for driving the electric motor 20. When the control unit 52 receives the vehicle speed signal and the torque signal described above, the control unit 52 transmits currents corresponding to the signals to the electric motor 20 for power assistance and causes the electric motor 20 to be driven, thereby assisting a steering force with torque of the rotary shaft 22. In this case, the control unit 52 performs feedback control of a current of the electric motor 20 in accordance with the rotational angle of the rotary shaft 22 received from the rotational angle detector 15, and the control unit 52 adjusts the amount of power assistance.

Figure 3:
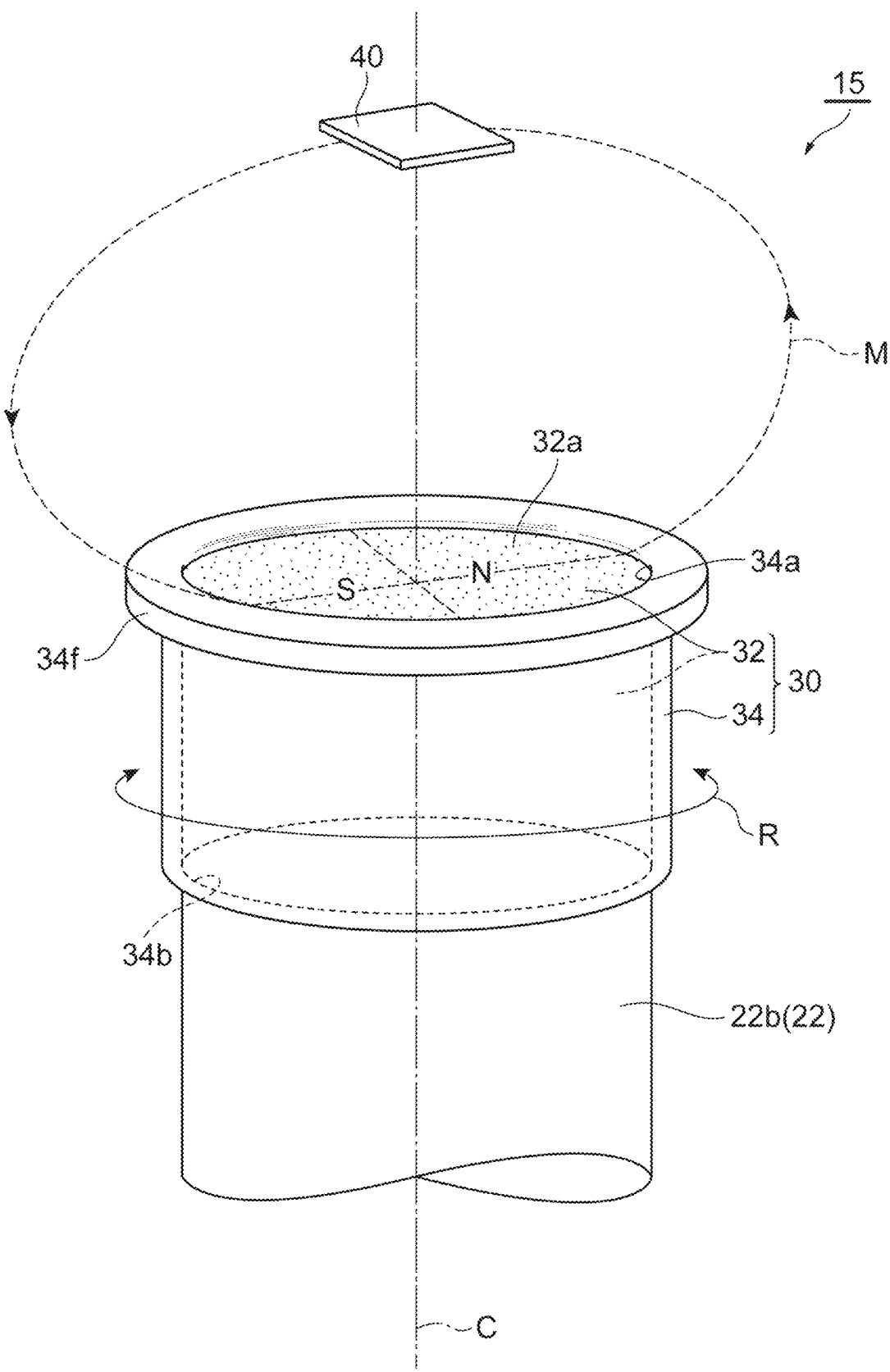
FIG. 3 is a schematic perspective view illustrating the rotational angle detector in FIG. 1.
Figure 4:
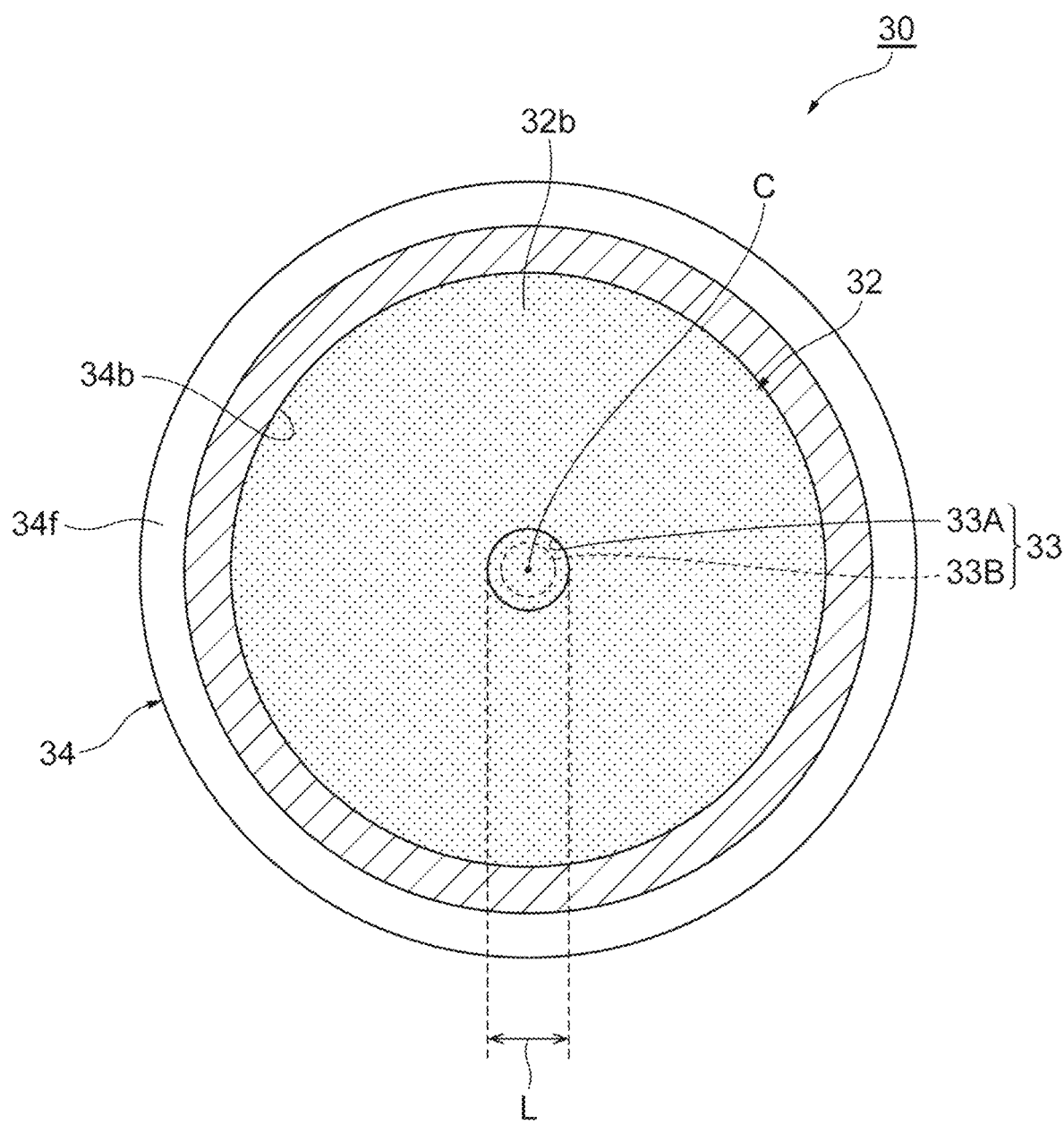
FIG. 4 is a view schematically illustrating a magnet structure seen from a second main surface side.

Next, with reference to FIGS. 3, 4, and 5, the configurations of the magnet structure 30 and the TMR element 40 of the rotational angle detector 15 will be described. FIG. 3 is a schematic perspective view illustrating the rotational angle detector in FIG. 1. FIG. 4 is a view schematically illustrating a magnet structure seen from a second main surface side.

Figure 5:
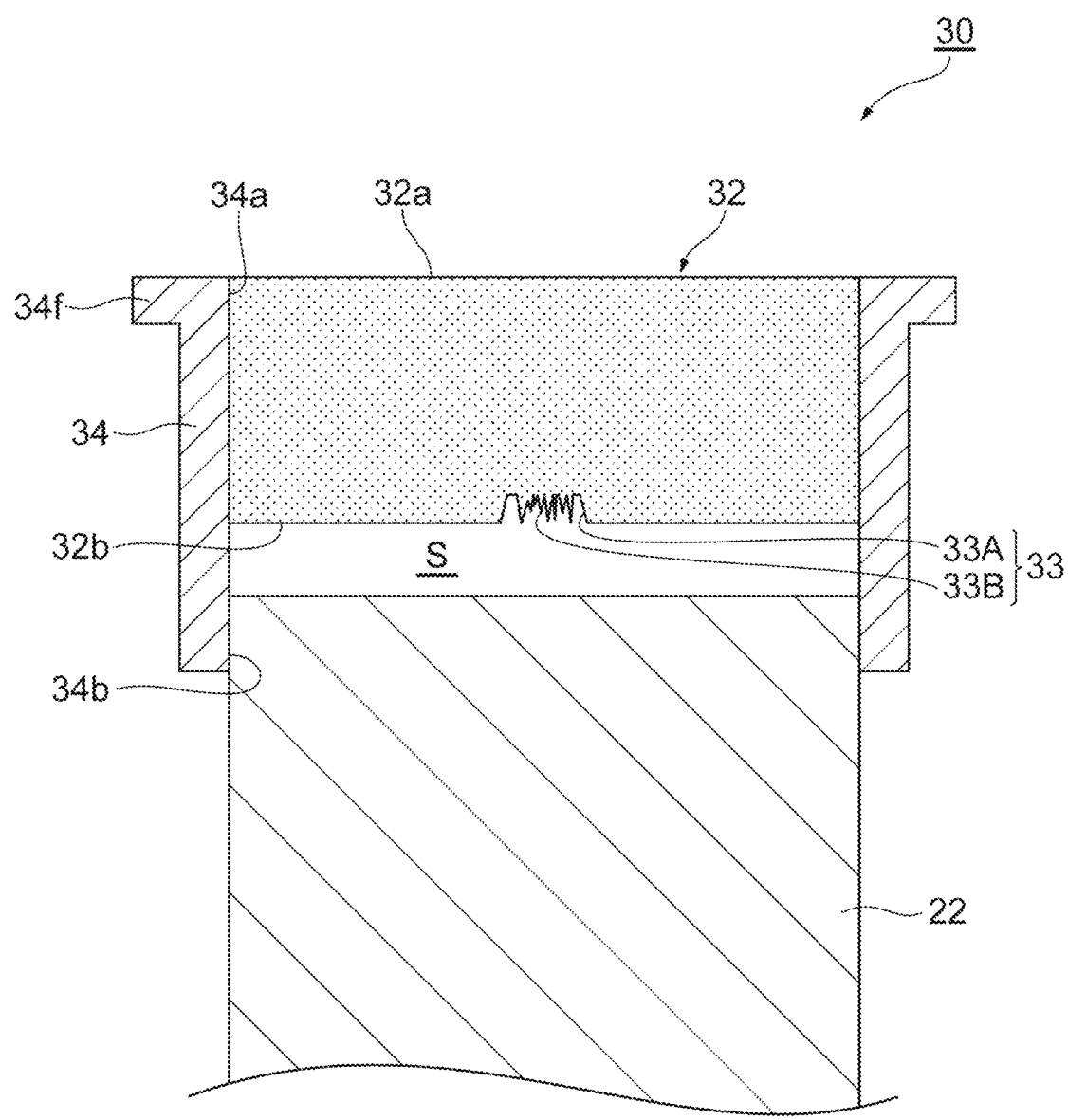
FIG. 5 is a cross-sectional view schematically illustrating the magnet structure in FIG. 3.

FIG. 5 is a cross-sectional view schematically illustrating the magnet structure in FIG. 3.

As illustrated in FIGS. 3 to 5, the magnet structure 30 includes a bonded magnet compact (magnet compact) 32 and a tubular member (support portion) 34. The bonded magnet compact 32 is formed by performing injection molding and exhibits an outer diameter having a disk shape (or a columnar shape). In addition, the bonded magnet compact 32 has a first main surface 32a facing the TMR element 40, and a second main surface 32b on a side opposite to the first main surface 32a. For example, the bonded magnet compact 32 is magnetized radially along the first main surface 32a and the second main surface 32b.

The thickness of the bonded magnet compact 32 (the length in a direction toward the second main surface 32b side from the first main surface 32a side) can be within a range of 1 mm to 25 mm, for example, and can also be within a range of 3 mm to 10 mm. The outer diameter (diameter) of the bonded magnet compact 32 can be within a range of 5 mm to 25 mm, for example, and can also be within a range of 10 mm to 20 mm.

The bonded magnet compact 32 contains a resin and a magnet powder. The kind of the resin is not particularly limited. A thermosetting resin or a thermoplastic resin can be adopted. Examples of thermosetting resins include an epoxy resin and a phenol resin. Examples of thermoplastic resins include an elastomer, an ionomer, an ethylene propylene copolymer (EPM), and an ethylene-ethyl acrylate copolymer. In addition, specifically, examples of elastomers include a styrene-based elastomer, an olefin-based elastomer, a urethane-based elastomer, a polyester-based elastomer, and a polyamide-based elastomer. A resin is selected in accordance with a shaping method, formability, heat-resisting properties, mechanical characteristics, and the like.

Since the bonded magnet compact 32 is formed by performing injection molding, it is preferable to use a thermoplastic resin as a resin. When the bonded magnet compact 32 is produced, there are cases in which a coupling agent, other additives, and the like are used in addition to these resins. When a thermoplastic resin is used, from the viewpoint of formability, durability, and the like, its melting point can be within a range of 100° C. to 350° C., for example, or can also be within a range of 120° C. to 330° C. The bonded magnet compact 32 may contain one kind of resin alone or may contain two kinds of resins or more.

Examples of magnet powder bodies include a rare earth magnet powder and a ferrite magnet powder. From the viewpoint of achieving a high magnetic characteristic, it is preferable that the magnet powder be a rare earth magnet powder. Examples of rare earth magnets include an R—Fe—B-based magnet, an R—Co-based magnet, and an R—Fe—N-based magnet. The symbol R indicates a rare earth element. In this specification, a rare earth element indicates scandium (Sc), yttrium (Y), and lanthanoides belonging to the group 3 in the long-form periodic table. For example, the lanthanoides include lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). In addition, the rare earth elements can be classified into light rare earth elements and heavy rare earth elements. In this specification "heavy rare earth elements" indicate Gd, Tb, Dy, Ho, Er, Tm, Yb, and Lu, and "light rare earth elements" indicate Sc, Y, La, Ce, Pr, Nd, Sm, and Eu.

It is more preferable that the magnet powder be an R—Fe—B-based magnet powder. It is preferable that the R—Fe—B-based magnet powder be an R(Nd, Pr)—Fe—B-based magnet powder containing at least one of Nd and Pr as R (rare earth element). As necessary, in addition to R, Fe, and B, the R—Fe—B-based magnet powder may contain other elements such as Co, Ni, Mn, Al, Cu, Nb, Zr, Ti, W, Mo, V, Ga, Zn, and Si, or unavoidable impurities.

When the bonded magnet compact 32 is an isotropic bonded magnet compact, the shape of a magnet powder is not particularly limited and may be any of a spherical shape, a granular shape, an acicular shape, a plate shape, and the like. On the other hand, when the bonded magnet compact 32 is an anisotropic bonded magnet compact, it is preferable that the shape of a magnet powder be an acicular shape, a plate shape, or the like. It is preferable that the mean particle size of the magnet powder be within a range of 30 μm to 250 μm, and it is more preferable that it be within a range of 50 μm to 200 μm. The bonded magnet compact 32 may contain one kind of magnet powder alone or may contain two kinds of magnet powders or more. The definition of the mean particle size is d50 in a particle size distribution of a volume reference in a laser diffraction particle size measuring method.

In addition, from the viewpoint of achieving desired magnetic characteristics and formability, the resin content can be within a range of 40 to 90 volume % and can also be within a range of 50 to 80 volume % with respect to the overall volume of the bonded magnet compact 32. In addition, from a similar viewpoint, the magnet powder content can be within a range of 10 to 60 volume % and can also be within a range of 20 to 50 volume % with respect to the overall volume of the bonded magnet compact 32.

The bonded magnet compact 32 has a gate portion 33 including a gate mark 33B formed by performing injection molding (refer to FIG. 4). The gate portion 33 is formed on the second main surface 32b. The gate portion 33 has a recess portion 33A provided on the second main surface 32b, and the gate mark 33B is formed on a bottom surface of the recess portion 33A inside the recess portion 33A.

When seen from the second main surface 32b side, the recess portion 33A exhibits a circular shape. A diameter L of the recess portion 33A corresponds to the diameter of the gate portion 33. Here, the diameter of the recess portion 33A indicates a diameter of the recess portion 33A on the second main surface 32b side. As an example, the diameter L of the recess portion 33A is within a range of 0.3 mm to 2.0 mm. When the diameter L of the recess portion 33A is less than 0.3 mm, it is difficult to perform injection molding. When the diameter L of the recess portion 33A is larger than 2.0 mm, it is difficult to perform cutting of a gate. Side walls of the recess portion 33A are inclined, and the diameter of the recess portion 33A on the first main surface 32a side is smaller than the diameter on the second main surface 32b side.

When seen from the second main surface 32b side, the gate portion 33 is provided at a position overlapping a center C on the second main surface 32b. In the present embodiment, the center of the gate portion 33 and the center C on the second main surface 32b substantially coincide with each other. The center of the gate portion 33 does not have to coincide with the center C on the second main surface 32b. That is, when seen from the second main surface 32b side, the center C on the second main surface 32b need only be positioned within the region of the gate portion 33. For example, the center C on the second main surface 32b may be positioned on the outer circumference of the gate portion 33.

Both ends (one end 34a and the other end 34b) of the tubular member 34 are released, so that the tubular member 34 has a cylindrical shape internally having a hollow part. In the present embodiment, the opening width of the one end 34a and the opening width of the other end 34b are substantially the same as each other. A flange portion 34f extending radially outward is provided on the one end 34a side of the tubular member 34. The shape of the flange portion 34f is a ring shape formed along the outer circumferential surface of the tubular member 34. For example, a mark for indicating the direction of a magnetic field of the bonded magnet compact 32 may be provided on the front surface of the flange portion 34f. For example, the mark is formed by providing unevenness through printing, deformation of the flange portion 34f, or the like.

The height of the tubular member 34 (the length in a direction toward the other end 34b side from the one end 34a side) can be within a range of 3 mm to 25 mm, for example, and it is preferable to be within a range of 5 mm to 20 mm. The height of the tubular member 34 is greater than the thickness of the bonded magnet compact 32. The outer diameter of the tubular member 34 can be within a range of 3 mm to 25 mm, for example, and it is preferable to be within a range of 5 mm to 20 mm. The inner diameter of the tubular member 34 can be within a range of 2 mm to 25 mm, for example, and it is preferable to be within a range of 3 mm to 20 mm. The outer diameter of the tubular member 34 including the flange portion 34f can be within a range of 3 mm to 30 mm, for example, and it is preferable to be within a range of 5 mm to 25 mm.

A material forming the tubular member 34 can be selected from nonmagnetic materials, for example. Examples of nonmagnetic materials forming the tubular member 34 include aluminum, copper, brass, and stainless steel. From the viewpoint of reducing the influence on a magnetic field generated by the bonded magnet compact 32, it is preferable that the tubular member 34 be formed of a nonmagnetic material. However, the tubular member 34 may be formed of a magnetic material. For example, the tubular member 34 can be produced by performing press working.

The bonded magnet compact 32 is disposed inside (hollow part) the tubular member 34. A side surface (surface connecting the first main surface 32a and the second main surface 32b to each other) of the bonded magnet compact 32 comes into contact with the inner circumferential surface of the tubular member 34. That is, the tubular member 34 holds the side surface of the bonded magnet compact 32. The first main surface 32a of the bonded magnet compact 32 is disposed on the one end 34a side of the tubular member 34, and the second main surface 32b of the bonded magnet compact 32 is disposed on the other end 34b side of the tubular member 34. For example, a depression and/or a projection for preventing positional displacement of the bonded magnet compact 32 with respect to the tubular member 34 may be provided on the inner circumferential surface of the tubular member 34.

As illustrated in FIG. 5, the bonded magnet compact 32 is disposed to be unevenly distributed on the one end 34a side of the tubular member 34. In the present embodiment, the first main surface 32a of the bonded magnet compact 32 and one end of the tubular member 34 on the one end 34a side substantially coincide with each other. In addition, since the thickness of the bonded magnet compact 32 is smaller than the height of the tubular member 34, the second main surface 32b of the bonded magnet compact 32 is disposed to be closer to the one end 34a side than the other end 34b of the tubular member 34 and is further recessed than the other end 34b on the inner side of the tubular member 34.

The magnet structure 30 is attached to the rotary shaft 22 of the electric motor 20 via the tubular member 34. More specifically, attachment of the magnet structure 30 is performed by press-fitting the rotary shaft 22 of the electric motor 20 into the other end 34b of the tubular member 34. In a state in which the magnet structure 30 is attached to the rotary shaft 22 of the electric motor 20, a closed space S is formed by the second main surface 32b of the bonded magnet compact 32, the inner circumferential surface of the tubular member 34, and the rotary shaft 22. The gate portion 33 is in a closed state inside the closed space S.

Examples of methods of forming the bonded magnet compact inside the tubular member 34 include injection molding (insert-molding). First, a first mold is prepared, and the tubular member 34 is fixed to the inside of the first mold such that the one end 34a of the tubular member 34 faces the inner side of the first mold. Next, in order to set the thickness of the bonded magnet compact 32, a second mold having a columnar protruding portion protruding from the other end 34b side to the one end 34a side of the tubular member 34 is attached to the first mold. Accordingly, the molds are in a closed state, thereby forming a cavity in which the bonded magnet compact 32 can be produced. Subsequently, a raw material composition containing a resin and a magnet powder is fluidified by performing heating or the like and is injected into the cavity inside the molds via a gate. Thereafter, the raw material composition is solidified by performing cooling or the like, and the bonded magnet compact 32 is formed on the one end 34a side inside the tubular member 34. When the bonded magnet compact 32 is taken out from the gate and the molds, a connection part between the gate and the bonded magnet compact 32 becomes the gate mark 33B. As a result, the gate portion 33 including the gate mark 33B is formed. When the bonded magnet compact 32 is an isotropic bonded magnet compact, injection molding is performed without applying an external magnetic field. On the other hand, when the bonded magnet compact 32 is an anisotropic bonded magnet compact, injection molding is performed within a magnetic field. Ultimately, the bonded magnet compact 32 is magnetized, and the N pole and the S pole are formed.

Returning to FIG. 3, in the magnet structure 30, the N pole and the S pole of the bonded magnet compact 32 are formed to be radially separated from each other in the bonded magnet compact 32. Accordingly, a static magnetic field is generated around the magnet structure 30, as indicated with the symbol M in the diagram, and a magnetic field is generated in a direction perpendicular to the height direction of the tubular member 34. The direction of the magnetic field M changes in accordance with a rotation position of the magnet structure 30 in a rotation direction R. Therefore, when the TMR element 40 disposed to face the magnet structure 30 on the one end 34a side detects the direction of the magnetic field M, the rotational angle of the magnet structure 30 can be detected.

In the rotational angle detector 15, the rotary shaft 22 of the electric motor 20 is attached to the other end 34b of the tubular member 34. Then, the magnet structure 30 rotates in the rotation direction R in association with turning of the rotary shaft 22. Therefore, the rotational angle of the rotary shaft 22 of the electric motor 20 can be detected by detecting the rotational angle of the magnet structure 30.

As described above, the bonded magnet compact 32 of the magnet structure 30 has the gate portion 33 which is provided on the second main surface 32b and includes the gate mark 33B formed by performing injection molding. The gate portion 33 is provided at a position overlapping the center C on the second main surface 32b when seen from the second main surface 32b side. In this manner, if the gate portion 33 is provided on the second main surface 32b, the first main surface 32a facing the TMR element 40 can be formed to be flat. Therefore, a magnetic field having highly symmetrical properties can be generated on the first main surface 32a side. In addition, if the gate portion 33 which may affect a magnetic field generated by the bonded magnet compact 32 is provided at a position overlapping the center C on the second main surface 32b, the influence of the gate portion 33 on the symmetrical properties of a magnetic field on the first main surface 32a side can be reduced. Therefore, a magnetic field having highly symmetrical properties can be generated by the magnet structure 30.

In addition, in a case in which the gate mark 33B is provided at a position overlapping the center C on the second main surface 32b, when the bonded magnet compact 32 is formed by performing injection molding, a raw material composition containing a resin and a magnet powder is injected from a middle portion of the cavity of the molds. In this case, the raw material composition flows to be spread from the middle portion of the cavity to the outer circumference side. Therefore, weld lines caused by merged and fused flows of the raw material composition are not formed. In this manner, weld lines which may affect a magnetic field generated by the bonded magnet compact 32 are prevented from being formed. Therefore, a magnetic field having higher symmetrical properties can be generated by the magnet structure 30.

The tubular member 34 supports the side surface of the bonded magnet compact 32 on the one end 34a side. The first main surface 32a of the bonded magnet compact 32 is disposed on the one end 34a side of the tubular member 34. The second main surface 32b is disposed to be closer to the one end 34a side than the other end 34b on the other end 34b side opposite to the one end 34a side of the tubular member 34. Accordingly, the magnet structure 30 can be attached to the rotary shaft 22 of the electric motor 20 via the other end 34b of the tubular member 34. In this case, the second main surface 32b is disposed to be closer to the one end 34a side (inner side) than the other end 34b. Therefore, in a state in which the magnet structure 30 is attached to the rotary shaft 22, the closed space S is formed by the second main surface 32b, the tubular member 34, and the rotary shaft 22. Accordingly, the gate portion 33 is positioned inside the closed space S. Therefore, contamination can be prevented from being generated due to the gate mark 33B.

The rotational angle detector 15 includes the magnet structure 30 and the TMR element 40 which is an MR element disposed to face the first main surface 32a of the magnet structure 30. Since this rotational angle detector 15 includes the above-described magnet structure 30 which can generate a magnetic field having highly symmetrical properties, the accuracy of detecting a rotational angle can be enhanced.

The electric power steering device 50 includes the rotational angle detector 15. Since this electric power steering device 50 includes the above-described rotational angle detector 15 which can enhance the accuracy of detecting a rotational angle, highly accurate torque assistance can be performed.

Figure 6:
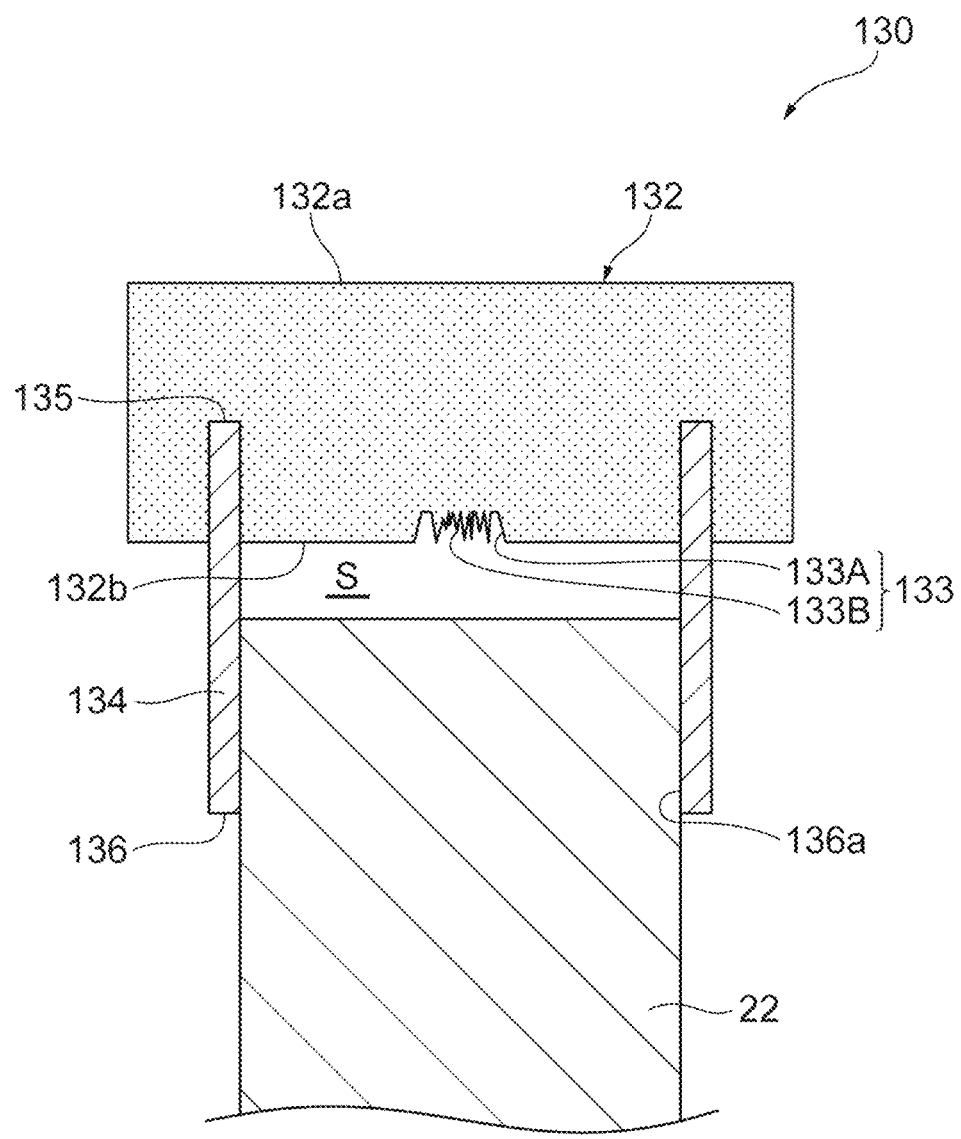
FIG. 6 is a cross-sectional view schematically illustrating a magnet structure according to a modification example.

Next, with reference to FIG. 6, a modification example of the magnet structure 30 will be described. As illustrated in FIG. 6, similar to the magnet structure 30, a magnet structure 130 according to the modification example has a bonded magnet compact 132. The bonded magnet compact 132 has a first main surface 132a, a second main surface 132b, and a gate portion 133 including a gate mark 133B. In the magnet structure 130, as a support portion supporting the bonded magnet compact 132, in place of the tubular member 34, a shaft 134 having a smaller outer diameter than the bonded magnet compact 132 is provided.

The shaft 134 is an elongated member having a tubular shape extending along the central axis of the bonded magnet compact 132 and has a substantially cylindrical outer diameter. The shaft 134 is attached to the second main surface 132b side of the bonded magnet compact 132 and extends in a direction intersecting the second main surface 132b. The shaft 134 is orthogonal to the second main surface 132b. When seen from the second main surface 132b side, the central axis of the shaft 134 substantially coincides with the center of the bonded magnet compact 132. The gate portion 133 including the gate mark 133B is positioned on the inner side of the shaft 134.

The shaft 134 may be attached to a position away from the center of the bonded magnet compact 132 by causing the central axis of the shaft 134 and the center of the bonded magnet compact 132 to deviate from each other. In addition, the external shape of the shaft 134 is not limited to a circular shape and may be a rectangular shape or an elliptic shape.

The shaft 134 has a first end portion 135 to which the bonded magnet compact 132 is attached, and a second end portion 136 which is attached to the rotary shaft 22 of the electric motor 20. A part of the shaft 134 on the first end portion 135 side is in a state in which the part enters the inside of the bonded magnet compact 132. A hole 136a extending along the central axis of the shaft 134 is provided in the second end portion 136. When the rotary shaft 22 disposed coaxially with the shaft 134 is attached to the shaft 134, the rotary shaft 22 of the electric motor 20 is press-fitted into the hole 136a of the second end portion 136. In a state in which the magnet structure 130 is attached to the rotary shaft 22 of the electric motor 20, the closed space S is formed by the second main surface 132b of the bonded magnet compact 132, the inner circumferential surface of the shaft 134, and the rotary shaft 22. The gate portion 133 is in a closed state inside the closed space S.

The length of the shaft 134 can be within a range of 3 mm to 20 mm, for example, and can also be within a range of 5 mm to 15 mm. In addition, the diameter of the shaft 134 can be within a range of 3 mm to 10 mm, for example.

The bonded magnet compact 132 is attached to the first end portion 135 of the shaft 134 while the bonded magnet compact 132 is formed by performing injection molding. When injection molding is performed, similar to the case of using the tubular member 34, the shaft 134 is fixed to the molds, and then a raw material composition containing a resin and a magnet powder is injected into the cavity inside the molds via a gate. In this case, the gate is inserted from the inner side of the tubular shaft 134. Thereafter, the raw material composition is solidified by performing cooling or the like, and the bonded magnet compact 132 is formed in the first end portion 135 of the shaft 134.

In the magnet structure 130 described above, the support portion is a tubular shaft 134 which is attached to the second main surface 132b side and extends in a direction intersecting the second main surface 132b. When seen from the second main surface 132b side, the gate portion 133 is positioned on the inner side of the shaft 134. According to this configuration, the magnet structure 130 can be attached to the rotary shaft 22 of the electric motor 20 via the shaft 134. In this case, in a state in which the magnet structure 130 is attached to the rotary shaft 22, the closed space S is formed by the second main surface 132b, the shaft 134, and the rotary shaft 22. Since the gate portion 133 is positioned on the inner side of the shaft 134, the gate portion 133 is positioned inside the closed space S. Therefore, contamination can be prevented from being generated due to the gate mark 133B.

Figure 7:
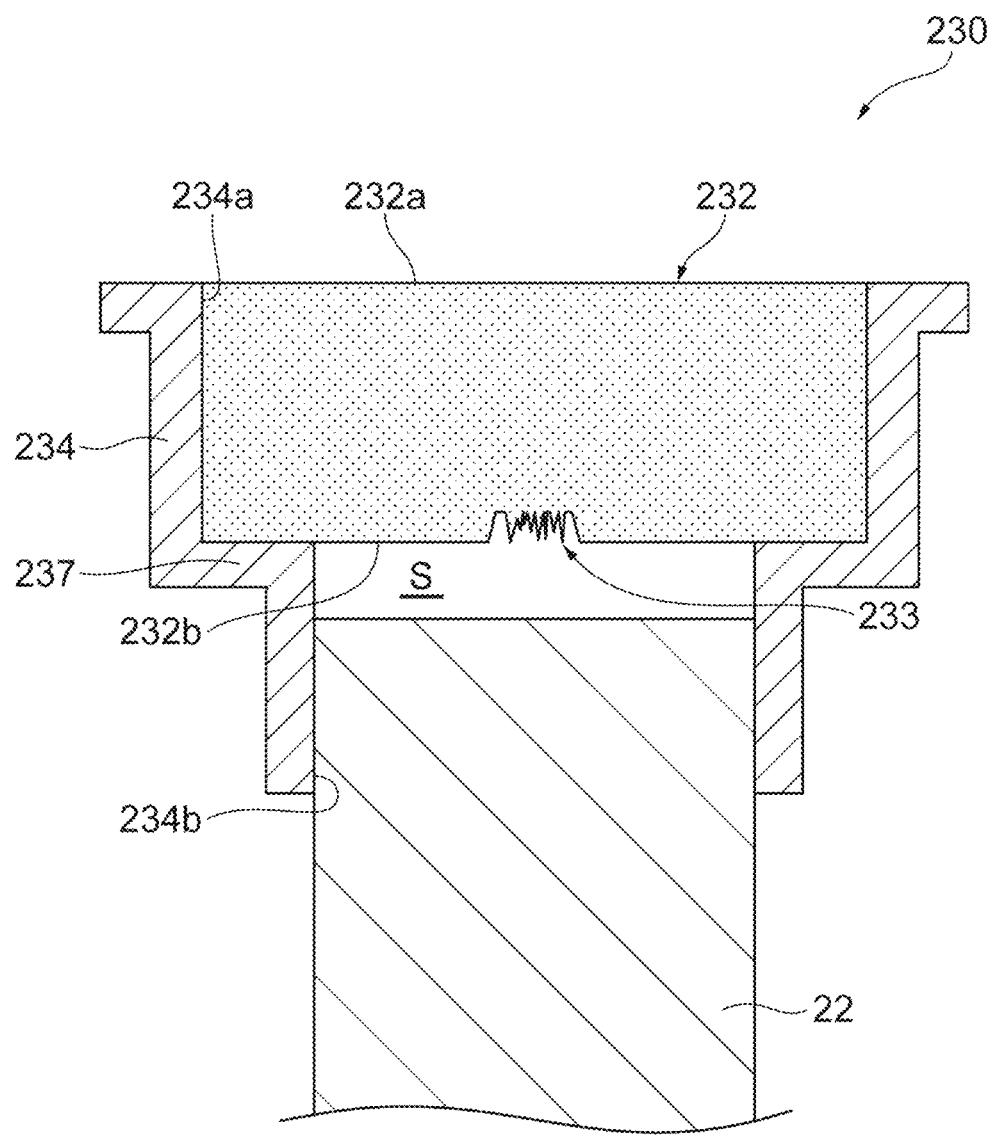
FIG. 7 is a cross-sectional view schematically illustrating a magnet structure according to another modification example.

Next, with reference to FIG. 7, another modification example of the magnet structure 30 will be described. As illustrated in FIG. 7, a magnet structure 230 according to another modification example includes a bonded magnet compact 232 and a tubular member 234. The bonded magnet compact 232 has a first main surface 232a, a second main surface 232b, and a gate portion 233. The tubular member 234 differs from the tubular member 34 in additionally having a narrowed portion 237 which protrudes to the inner side of a tubular member. The narrowed portion 237 is formed between one end 234a and the other end 234b of the tubular member 234, and the opening width of the other end 234b is smaller than the opening width of the one end 234a. The bonded magnet compact 232 of the second main surface 232b abuts on the narrowed portion 237.

In the magnet structure 230 described above, similar to the magnet structure 30, the bonded magnet compact 232 is disposed inside the tubular member 234 on the one end 234a side, and the second main surface 232b is disposed to be closer to the one end 234a side (inner side) than the other end 234b. Therefore, even in the magnet structure 230, it is possible to achieve effects similar to those of the magnet structure 30.

Hereinabove, the embodiment of the present invention has been described. However, the present invention is not limited to the embodiment described above, and various changes can be made. For example, in the embodiment described above, an example in which the bonded magnet compact 32 has a disk shape has been described. However, the shape of the bonded magnet compact 32 is not particularly limited. For example, the external shape of the bonded magnet compact 32 is not limited to a disk shape and may be an external shape of a different plate shape (for example, a columnar shape or a polygonal plate shape such as a quadrangular plate shape or a hexagonal plate shape). The magnet structure 30 can generate a magnetic field having highly symmetrical properties when the outer diameter of the bonded magnet compact 32 has point symmetry. When the external shape of the bonded magnet compact 32 is a polygonal plate shape, for example, the intersection point of diagonal lines on the second main surface 32b can become the center C and can become the center of gravity on the second main surface 32b.

In addition, in the embodiment described above, an example in which magnetization is radially performed along the first main surface 32a and the second main surface 32b of the bonded magnet compact 32 has been described. However, the magnetization direction is not particularly limited. For example, magnetization may be performed in a direction orthogonal to the first main surface 32a and the second main surface 32b of the bonded magnet compact 32. Alternatively, another magnetization method such as a so-called dual-face quadrupoles magnetization may be used.

In addition, in the embodiment described above, a case in which the gate portion 33 has a circular shape has been described. However, the shape of the gate portion 33 is not particularly limited and can be suitably changed in accordance with the shape of a gate used in injection molding. In addition, the gate portion 33 does not have to have the recess portion 33A. In this case, the gate mark 33B is formed on the second main surface 32b.

In addition, in the embodiment described above, an example in which the support portion has a tubular shape has been described. However, the support portion does not have to have a tubular shape. For example, the support portion may have an opening on only one end side thereof, and the closed space S may be fainted on the second main surface 32b side by causing the bonded magnet compact 32 to be accommodated in this opening.

In addition, in the embodiment described above, an example in which the TMR element 40 is used as an MR element has been described. However, the kind of the MR element is not particularly limited and can be suitably changed. It is suitable to use a highly sensitive MR element of which the MR ratio is 90% or higher. In such a case, the effects of the present invention become more noticeable.

What is claimed is:

1. A magnet structure for a magnetoresistance effect element, comprising:
   a magnet compact that has a first main surface facing the magnetoresistance effect element, and a second main surface on a side opposite to the first main surface; and
   a support portion that supports the magnet compact,
   wherein the magnet compact has a gate portion which is provided on the second main surface and includes a gate mark formed by performing injection molding,
   the gate portion is provided at a position overlapping a center on the second main surface when seen from the second main surface side,
   the support portion is a tubular member, and
   the tubular member is open at one end side and at another end side opposite to the one end side.

2. The magnet structure according to claim 1,
   wherein the tubular member supports a side surface of the magnet compact on the one end side,
   the first main surface of the magnet compact is disposed on the one end side of the support portion, and
   the second main surface is disposed to be closer to the one end side than the another end side opposite to the one end side of the support portion.

3. The magnet structure according to claim 1,
   wherein the support portion is a tubular shaft which has a smaller outer diameter than the magnet compact, is attached to the second main surface side, and extends in a direction intersecting the second main surface, and
   the gate portion is positioned on an inner side of the shaft when seen from the second main surface side.

4. A rotational angle detector comprising:
   the magnet structure according to claim 1; and
   a magnetoresistance effect element that is disposed to face the first main surface of the magnet structure.

5. The rotational angle detector according to claim 4,
   wherein a magnetoresistance ratio of the magnetoresistance effect element is 90% or higher.

6. The rotational angle detector according to claim 4,
   wherein the magnetoresistance effect element is a tunnel magnetoresistance effect element.

7. An electric power steering device comprising:
   the rotational angle detector according to claim 4.

* * * * *